US012641073B2

(12) United States Patent (10) Patent No.: US 12,641,073 B2
De Gregorio Rodriguez et al. (45) Date of Patent: May 26, 2026

(54) METHODS AND APPARATUSES FOR OBTAINING A KEY SET FROM A NETWORK REPOSITORY FUNCTION

(71) Applicant: Telefonaktiebolaget LM Ericsson (PUBL), Stockholm (SE)

(72) Inventors: Jesus Angel De Gregorio Rodriguez, Boadilla del Monte (ES); Emiliano Merino Vazquez, Madrid (ES); Franco Foresti, Madrid (ES); Pablo Martinez de la Cruz, Madrid (ES); Xin Yu Zhang, Shanghai (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 193 days.

(21) Appl. No.: 18/260,955

(22) PCT Filed: Dec. 13, 2021

(86) PCT No.: PCT/EP2021/085551
§ 371 (c)(1),
(2) Date: Jul. 11, 2023

(87) PCT Pub. No.: WO2022/152484
PCT Pub. Date: Jul. 21, 2022

(65) Prior Publication Data
US 2024/0064139 A1 Feb. 22, 2024

(30) Foreign Application Priority Data
Jan. 13, 2021 (EP) ..................................... 21382015

(51) Int. Cl.
*H04L 9/40* (2022.01)

(52) U.S. Cl.
CPC .......... *H04L 63/083* (2013.01); *H04L 63/102* (2013.01)

(58) Field of Classification Search
CPC ............................ H04L 63/083; H04L 63/102
See application file for complete search history.

(56) References Cited

U.S. PATENT DOCUMENTS

2019/0251241 A1* 8/2019 Bykampadi ......... H04W 12/009

FOREIGN PATENT DOCUMENTS

WO WO2019076634 A1 4/2019
WO WO-2021165194 A1 * 8/2021 ......... H04L 63/0823
WO WO-2024092810 A1 * 5/2024 ............ H04W 48/18

OTHER PUBLICATIONS

ETSI GS NFV-SEC 022 v0.0.1 (Nov. 2019) Network Functions Virtualisation (NFV) Release 2; Security; Access Token Specification for API Access.

(Continued)

*Primary Examiner* — Hee Soo Kim
(74) *Attorney, Agent, or Firm* — Baker Botts L.L.P.

(57) ABSTRACT

Embodiments described herein provide methods and apparatuses for providing a network function, NF, service producer access to a key set, wherein the key set is for use in verifying an access token received from an NF service consumer. A method in a network repository function, NRF, comprises receiving a request from the NF service producer to provide an indication of services provided by the NRF; and responsive to the request, transmitting a first address where the key set can be retrieved, as part of an indication of an authorization service.

20 Claims, 10 Drawing Sheets

Receive a request from the NF service producer to provide an indication of services provided by the NRF _401

Responsive to the request, transmit a first uniform resource identifier, URI, for the key set as part of an indication of an authorisation service _402

(56) References Cited

OTHER PUBLICATIONS

ETSI TS 133 501 v16.4.0 (Nov. 2020) 5G; Security architecture and procedures for 5G System (3GPP TS 33.501 version 16.4.0 Release 16).

EPO Communication Pursuant to Article 94(3) EPC issued for Application No. 21 836 154.1-1206—Jan. 16, 2025.

M. Jones et al., Jun. 2018 "OAuth 2.0 Authorization Server Metadata" Internet Engineering Task Force (IETF); Request for Comments; 8414; ISSN: 2070-1721.

D. Hardt, Ed., Oct. 2012 "The OAuth 2.0 Authorization Framework" Internet Engineering Task Force (IETF); Request for Comments; 6749; ISSN: 2070-1721.

3GPP TSG CT4 Meeting #79, Krakow, Poland; Aug. 21-25, 2017; Source: Ericsson; Title: Pseudo-CR on Service Discovery and Registration using NRF service; Spec: 3GPP TR 29.891-v0.3.0 (C4-174083).

3GPP TS 29.510 V16.6.0 (Dec. 2020); 3rd Generation Partnership Project; Technical Specification Group Core Network and Terminals; 5G System; Network Function Repository Services; Stage 3 (Release 16).

3GPP TS 33.501 V17.0.0 (Dec. 2020); 3rd Generation Partnership Project; Technical Specification Group Services and System Aspects; Security architecture and procedures for 5G system (Release 17).

M. Jones et al., May 2015 "JSON Web Signature (JWS)" Internet Engineering Task Force (IETF); Request for comments: 7515; ISSN: 2070-1721.

3GPP TS 33.210 V16.4.0 (Jul. 2020); 3rd Generation Partnership Project; Technical Specification Group Services and System Aspects;Network Domain Security (Nds); IP network layer security (Release 16).

PCT International Search Report issued for International application No. PCT/EP2021/085551—May 11, 2022.

PCT Written Opinion of the International Searching Authority issued for International application No. PCT/EP2021/085551—May 11, 2022.

* cited by examiner

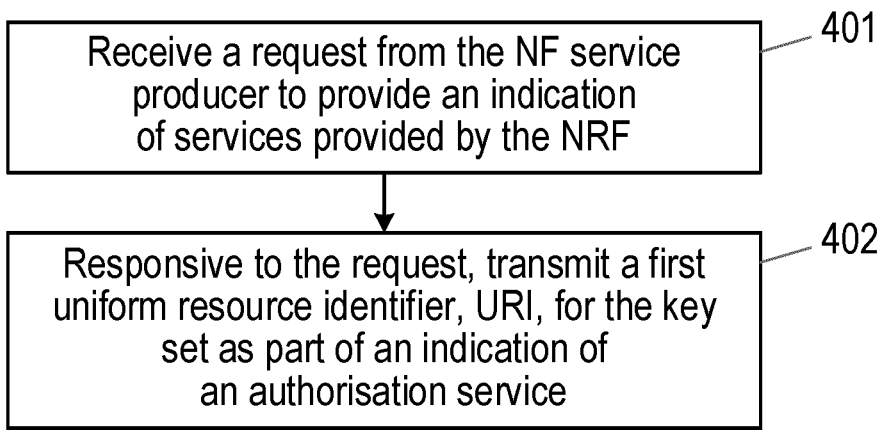

Receive a request from the NF service producer to provide an indication of services provided by the NRF — 401

Responsive to the request, transmit a first uniform resource identifier, URI, for the key set as part of an indication of an authorisation service — 402

Figure 4

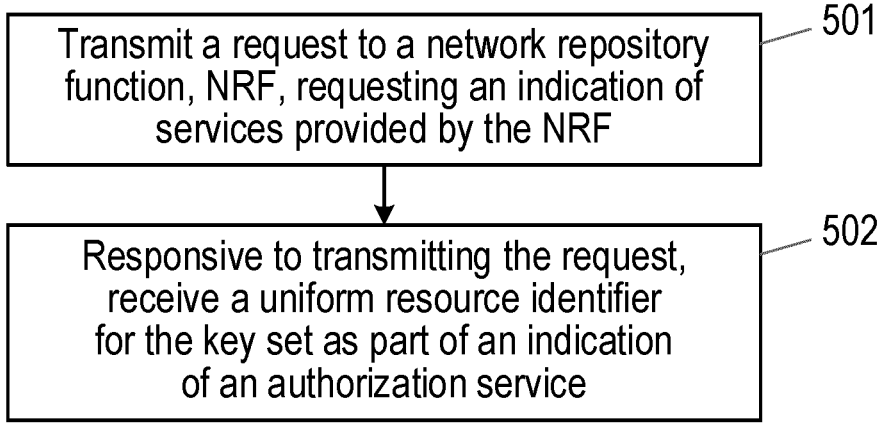

Transmit a request to a network repository function, NRF, requesting an indication of services provided by the NRF — 501

Responsive to transmitting the request, receive a uniform resource identifier for the key set as part of an indication of an authorization service — 502

Figure 5

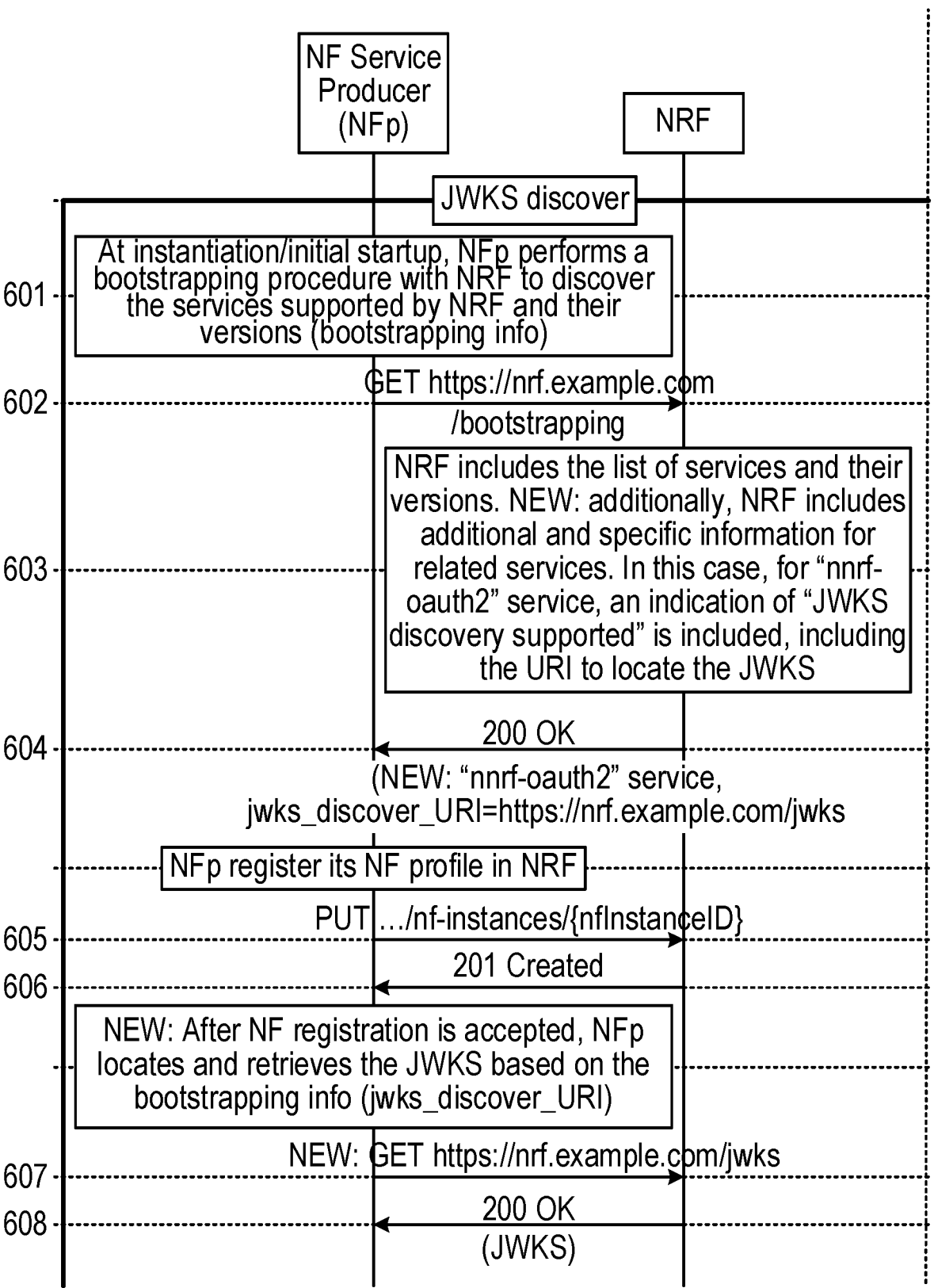

NF Service
Producer
(NFp)

NRF

JWKS discover

601 — At instantiation/initial startup, NFp performs a bootstrapping procedure with NRF to discover the services supported by NRF and their versions (bootstrapping info)

602 — GET https://nrf.example.com /bootstrapping

603 — NRF includes the list of services and their versions. NEW: additionally, NRF includes additional and specific information for related services. In this case, for "nnrf-oauth2" service, an indication of "JWKS discovery supported" is included, including the URI to locate the JWKS 604 — 200 OK
(NEW: "nnrf-oauth2" service, jwks_discover_URI=https://nrf.example.com/jwks NFp register its NF profile in NRF 605 — PUT .../nf-instances/{nfInstanceID}

606 — 201 Created

NEW: After NF registration is accepted, NFp locates and retrieves the JWKS based on the bootstrapping info (jwks_discover_URI)

607 — NEW: GET https://nrf.example.com/jwks

608 — 200 OK
(JWKS)

Figure 6

METHODS AND APPARATUSES FOR OBTAINING A KEY SET FROM A NETWORK REPOSITORY FUNCTION

PRIORITY

This nonprovisional application is a U.S. National Stage Filing under 35 U.S.C. § 371 of International Patent Application Serial No. PCT/EP2021/085551 filed Dec. 13, 2021 and entitled "METHODS AND APPARATUSES FOR OBTAINING A KEY SET FROM A NETWORK REPOSITORY FUNCTION" which claims priority to European Patent Application No. 21382015.2 filed Jan. 13, 2021, both of which are hereby incorporated by reference in their entirety.

TECHNICAL FIELD

Embodiments described herein relate to methods and apparatuses for providing a network function, NF, service producer access to a key set, wherein the key set is for use in verifying an access token received from an NF service consumer.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The Network Repository Function (NRF) is a key network function (NF) within the 5G core (5GC) Service Based Architecture (SBA) Framework that provides registration and discovery capabilities among the different NFs within the 5GC.

FIG. 1 illustrates registration of an NF service producer 100 at an NRF 110.

In step 101, the NF service producer 100 (e.g. unified data management (UDM) type) registers its NF profile in the NRF.

In step 102, the NRF 110 stores the NF profile of the NF service producer. In step 103, the NRF 110 indicates to the NF service producer that the NF profile has been successfully stored.

Other NFs may then discover the NF service producer automatically by querying the NRF to find NFs of a given type (e.g. UDM type).

When an NF service producer registers in the NRF, it may indicate in its NF profile the authorization information for Oauth (an open standard for access delegation) for specific service operations. The NF service producer may at as the resource server within the OAuth framework.

The NRF may be considered to act as an authorization server within the Oauth framework, as described in RFC 6749 and standardized in 3GPP TS 33.501.

FIG. 2 is a signaling diagram illustrating an NRF 110 acting as an authorization server.

In step 201, an NF service consumer 120 wishing to request authorization to consume (or access) a service from a NF service producer, transmits a request for an access token to the NRF 110. The request may indicate the expected name of the NF service and the expected NF type, the consumer NF type and a client identification.

In step 202, the NRF 110 authorizes the request, based on the information contained in the request, and generates an access token.

In step 203, the NRF 110 transmits the access token to the NF service consumer 120. In some examples, a scope of authorization may be included with the access token. The scope of authorization may comprise the services and/or the resources/service operations authorized by the NF service producer 100 to the NF service consumer 120, e.g. if NRF authorizes Subscriber Data Management Service (SDM service) and User Equipment Context Management service (UECM service), it will indicate so in the access token generated. The NRF 110 digitally signs the generated access token based on a shared secret or private key as described in RFC 7515, JSON Web Signature (JWS) and according to 3GPP TS 33.210.

FIG. 3 illustrates an NF service consumer 120 accessing a service provided by an NF service producer 100.

In step 301, the NF service consumer 120 transmits a service request to the NF service producer 100 comprising an access token.

In step 302, the NF Service producer 110 may ensure the integrity of the access token by verifying the signature using NRF's public key. If integrity check is successful, the NF Service producer verifies the claims in the access token, and if the access token allows the use of the requested service and operation (e.g. SDM), the request will be accepted in step 303.

The 3GPP OAuth authorization framework does not indicate any method to distribute the NRF's public key set, e.g. the JSON Web Key Set (JWKS), that the NF service producer 110 needs to verify the access token, when it has been signed by means of an NRF private key. There are proprietary ways to locate the JWKS, but it has not been described in 3GPP so, to assist a multi-vendor scenario, all NF service producers 110 need to support manual configuration of JWKS.

Manual configuration in the NF service producer of the JWKS for each NRF is a costly procedure, prone to errors, and does not immediately deploy any changes, updates, revoking or rotating of the JWKS of the NRF.

RFC 7515 also offers the possibility to indicate a uniform resource identifier (URI) for the JWKS uniform resource locator (URL) (jku), which is a URI that refers to a resource for a set of JSON-encoded public keys, one of which corresponds to the key used to digitally sign the JSON Web Signature (JWS).

This alternative is not an efficient solution, since for each service request the NF service producer must access the URI indicated by the jku to retrieve the JSON web Key (JWK) to verify the token.

SUMMARY

According to some embodiments there is provided a method in a network repository function, NRF, for providing a network function, NF, service producer access to a key set, wherein the key set is for use in verifying an access token received from an NF service consumer. The method comprises receiving a request from the NF service producer to provide an indication of services provided by the NRF; and responsive to the request, transmitting a first address where the key set can be retrieved, as part of an indication of an authorization service.

According to some embodiments there is provided a method in a network function, NF, service producer for obtaining access to a key set, wherein the key set is for use in verifying an access token received from an NF service consumer. The method comprises transmitting a request to a network repository function, NRF, requesting an indication of services provided by the NRF; and responsive to transmitting the request, receiving a first address, where the key set can be retrieved, as part of an indication of an authorization service.

According to some embodiments there is provided a method in a network repository function, NRF, for providing a notification of an event to a network function, NF, producer. The method comprises receiving a registration request from the NF service producer to register an NF profile of the NF service producer at the NRF, wherein the NF profile comprises an address associated with an event; and responsive to occurrence of the event, transmitting an indication of the event to the address.

According to some embodiments there is provided a method in a network function, NF service producer for receiving notifications of events from a network repository function, NRF. The method comprises: transmitting a registration request to the NRF to register an NF profile of the NF service producer at the NRF, wherein the NF profile comprises an address associated with an event; and responsive to occurrence of the event, receiving, from the NRF, an indication of the event at the address.

According to some embodiments there is provided a network repository function, NRF, for providing a network function, NF, service producer access to a key set, wherein the key set is for use in verifying an access token received from an NF service consumer. The NRF comprises processing circuitry configured to cause the NRF to receive a request from the NF service producer to provide an indication of services provided by the NRF; and responsive to the request, transmit a first address, where the key set can be retrieved, as part of an indication of an authorization service.

According to some embodiments there is provided a network function, NF, service producer for obtaining access to a key set, wherein the key set is for use in verifying an access token received from an NF service consumer. The NF service producer comprises processing circuitry configured to cause the NF service producer to transmit a request to a network repository function, NRF, requesting an indication of services provided by the NRF; and responsive to transmitting the request, receive a first address, where the key set can be retrieved, as part of an indication of an authorization service.

According to some embodiments there is provided a network repository function, NRF, for providing a notification of an event to a network function, NF, service producer. The NRF comprises processing circuitry configured to cause the NRF to receive a registration request from the NF service producer to register an NF profile of the NF service producer at the NRF, wherein the NF profile comprises an address associated with an event; and responsive to occurrence of the event, transmit an indication of the event to the address.

According to some embodiments there is provided a network function, NF service producer for receiving notifications of events from a network repository function, NRF. The NF service producer comprises processing circuitry configured to cause the NF service producer to transmit a registration request to the NRF to register an NF profile of the NF service producer at the NRF, wherein the NF profile comprises an address associated with an event; and responsive to occurrence of the event, receive, from the NRF, an indication of the event at the address.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 4 illustrates a method in a network repository function, NRF, for allowing a network function, NF, service producer access to a key set;

FIG. 5 illustrates a method in a network function, NF, service producer for obtaining access to a key set, wherein the key set is for use in verifying an access token received from an NF service consumer;

FIG. 6 is a signalling diagram illustrating an example implementation of the methods of FIGS. 4 and 5;

DESCRIPTION

Figure 1:
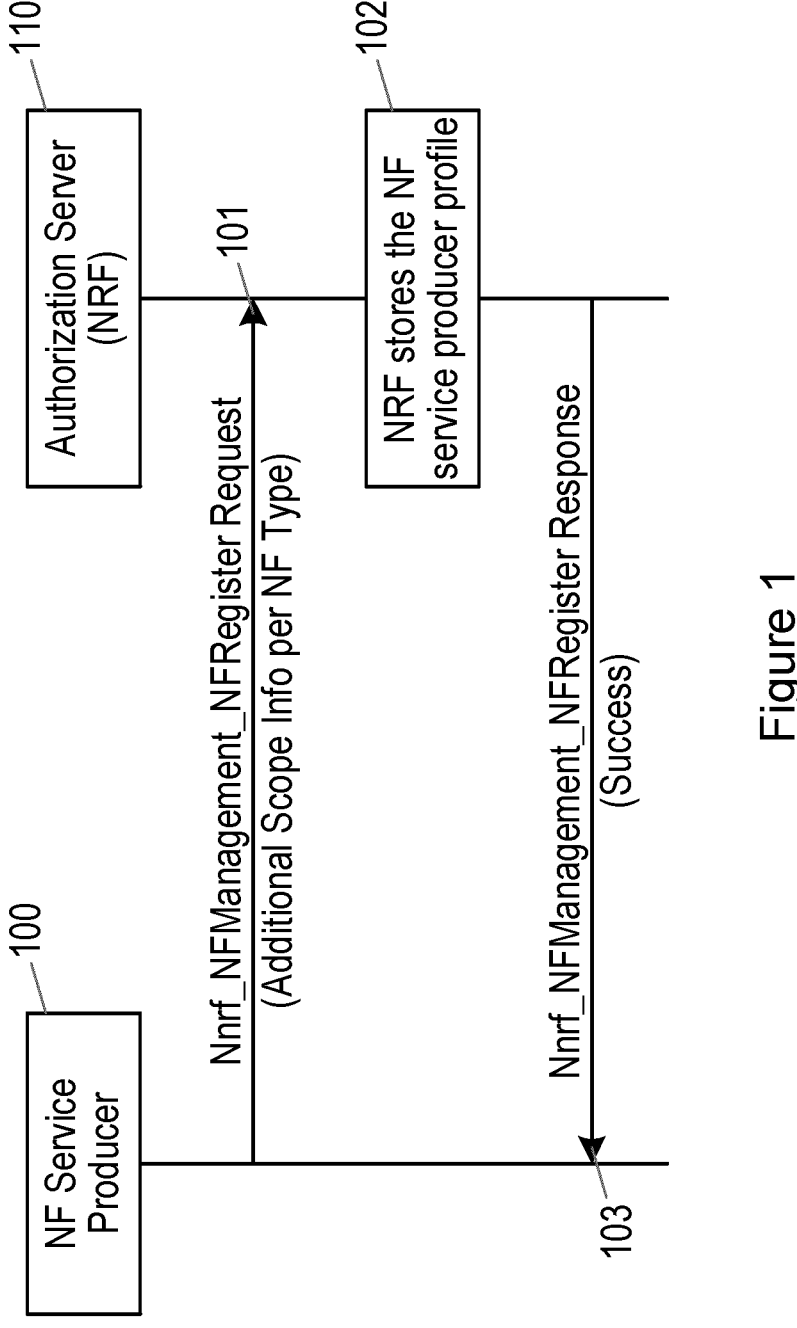
FIG. 1 illustrates registration of an NF service producer at an NRF.
Figure 2:
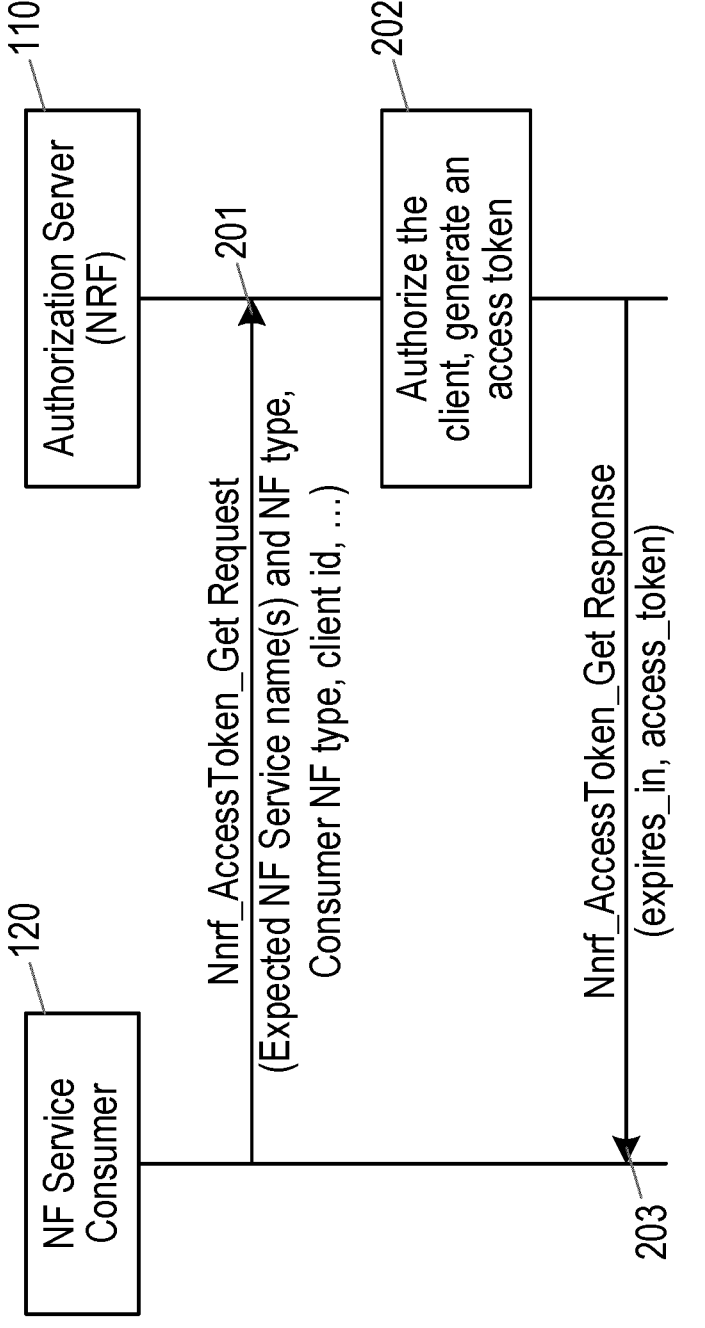
FIG. 2 is a signaling diagram illustrating an NRF acting as an authorization server.
Figure 3:
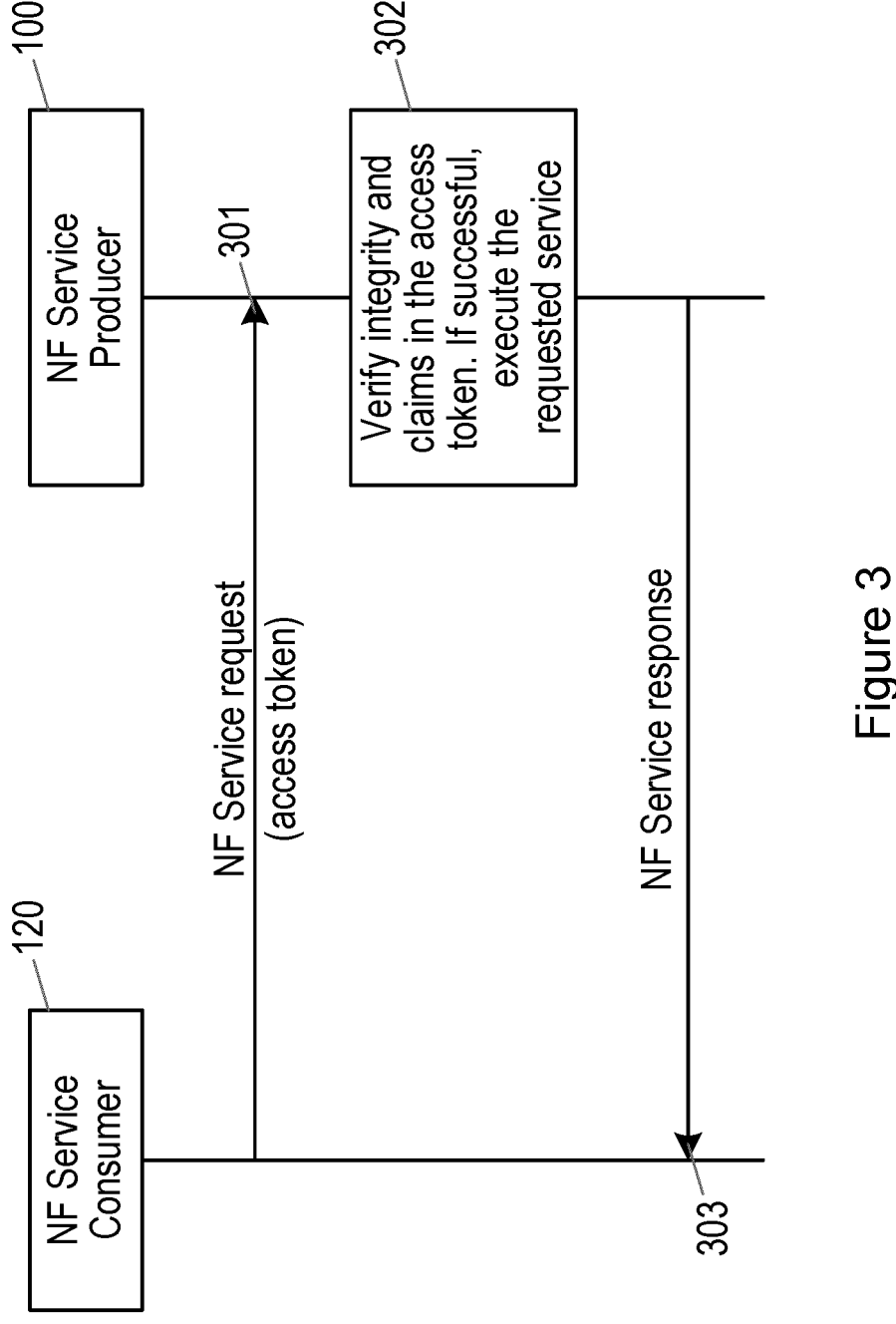
FIG. 3 illustrates an NF service consumer accessing a service provided by an NF service producer.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provide an efficient and automated mechanism to retrieve the JWKS of the NRF. Some embodiments also provide methods to provide updates to the JWKS.

In this way, the JWKS are not manually configured in each NF service producer, but they are automatically retrieved from the NRF.

FIG. 4 illustrates a method in a network repository function, NRF, for allowing a network function, NF, service producer access to a key set. The key set is for use in verifying an access token received from an NF service consumer. In particular, the key set may comprise a JSON web key set (JWKS). The key set may comprise one or more public keys.

In step 401, the NRF receives a request from the NF service producer to provide an indication of services provided by the NRF. In other words, at instantiation/initial start-up, an NF service producer (NFp) performs a bootstrapping procedure with the NRF to discover the services supported by NRF and their versions.

In step 402, the NRF, responsive to the request, transmits a first address where the key set can be retrieved. The first address may comprise a first uniform resource identifier (URI). This first URI may be included as part of additional and specific information related to the services it supports (in this case, as part of additional information for the "nnrf-oauth2" service).

FIG. 5 illustrates a method in a network function, NF, service producer for obtaining access to a key set, wherein the key set is for use in verifying an access token received from an NF service consumer. As previously described the key set may comprise a JSON web key set (JWKS).

In step 501, the NF service producer transmits a request to a network repository function, NRF, requesting an indication of services provided by the NRF. Again, this request may be sent as part of a bootstrapping procedure with the NRF to discover the services supported by NRF and their versions.

In step 502, the NF service producer, responsive to transmitting the request, receives a first address where the key set can be retrieved. The first address may comprise a first uniform resource identifier (URI). This first URI may be included as part of additional and specific information related to the services it supports (in this case, as part of additional information for the "nnrf-oauth2" service).

In some embodiments, the NF service producer transmits a registration request to the NRF to register an NF profile of the NF service producer at the NRF. After successfully performing its NF registration in the NRF, the NF service producer may then transmit a request for the key set to the first URI. The key set may then be received at the NF service producer from the NRF.

FIG. 6 is a signalling diagram illustrating an example implementation of the methods of FIGS. 4 and 5.

In step 601, at instantiation/initial start-up the NF service producer performs a bootstrapping procedure with the NRF to discover the services supported by the NRF and their versions.

In step 602, the NF service producer transmits the request for an indication of services provided by the NRF.

In step 603, the NRF collects the list of available services and their versions. Additionally the NRF includes additional and specific information for related services. In this example, for "nnrf-oauth2" service, and indication of key set discover is included, comprising the first URI to locate the key set.

In step 604, the NRF transmits the response to the request received in step 602. The response comprises the indication of the "nnrf-oauth2" service and the first URI (https://nrf.example.com/jwks) as part of the additional information associated to the "nnrf-oauth2" service.

In step 605, the NF service producer transmits a registration request to the NRF to register an NF profile of the NF service producer at the NRF. In step 606, the NRF returns the NF profile created.

In step 607, after transmitting the registration request, the NF service producer transmits a request to retrieve the key set to the first URI (jwks discover URI). In step 608, the NRF returns the key set (JWKS) to the NF service producer. The NF service producer stores the key set locally. The NF service producer may refresh the key set when required (e.g. when a signing-key in access token received is not found in the key set) or at any periodic time.

Figure 7:
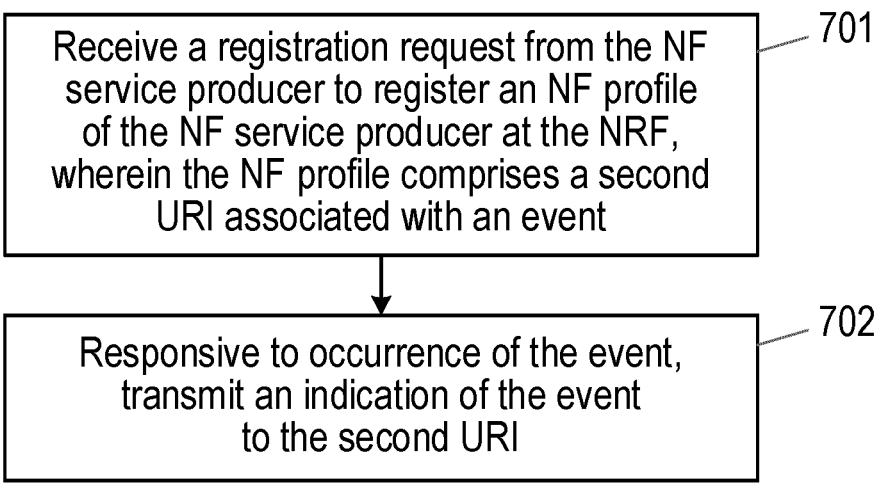
FIG. 7 illustrates a method in an NRF for providing notifications of an event to a network function, NF, producer.

FIG. 7 illustrates a method in an NRF for providing notifications of an event to a network function, NF, producer.

In step 701, the NRF receives a registration request from the NF service producer to register an NF profile of the NF service producer at the NRF, wherein the NF profile comprises a second address associated with an event detected by the NRF. The second address may comprise a second URI.

In step 702, responsive to occurrence of the event, the NRF transmits an indication of the event to the second URI.

Figure 8:
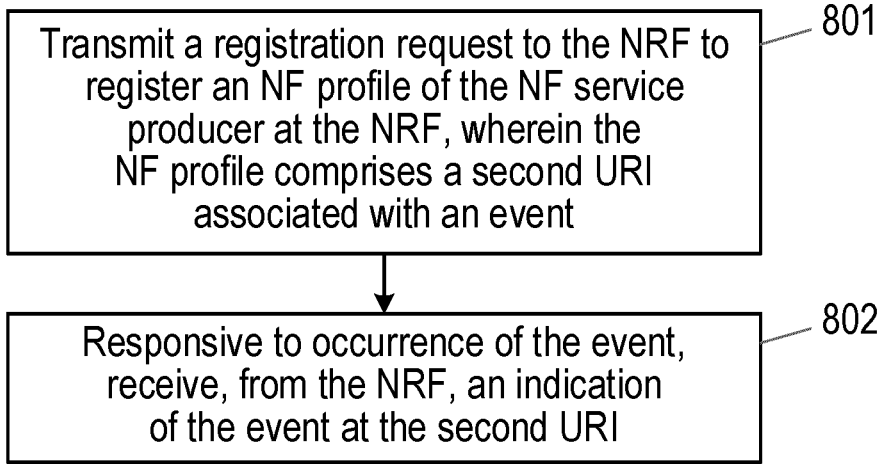
FIG. 8 illustrates a method in a network function, NF producer for receiving notifications of events detected by a network repository function, NRF.

FIG. 8 illustrates a method in a network function, NF producer for receiving notifications of events detected by a network repository function, NRF.

In step 801, the NF service producer transmits a registration request to the NRF to register an NF profile of the NF service producer at the NRF, wherein the NF profile comprises a second address associated with an event detected by the NRF. The second address may comprise a second URI.

In step 802, responsive to occurrence of the event, the NF service producer receives, from the NRF, an indication of the event at the second URI.

The event may comprise one of: an update to a key set for use in verifying an access token received from an NF service consumer, an NF status update for the NF service producer (e.g. via manual setting in the NRF), a NF group identification update for the NF service producer, a tracking area information update (TAI_INFO_UPDATE).

Figure 9:
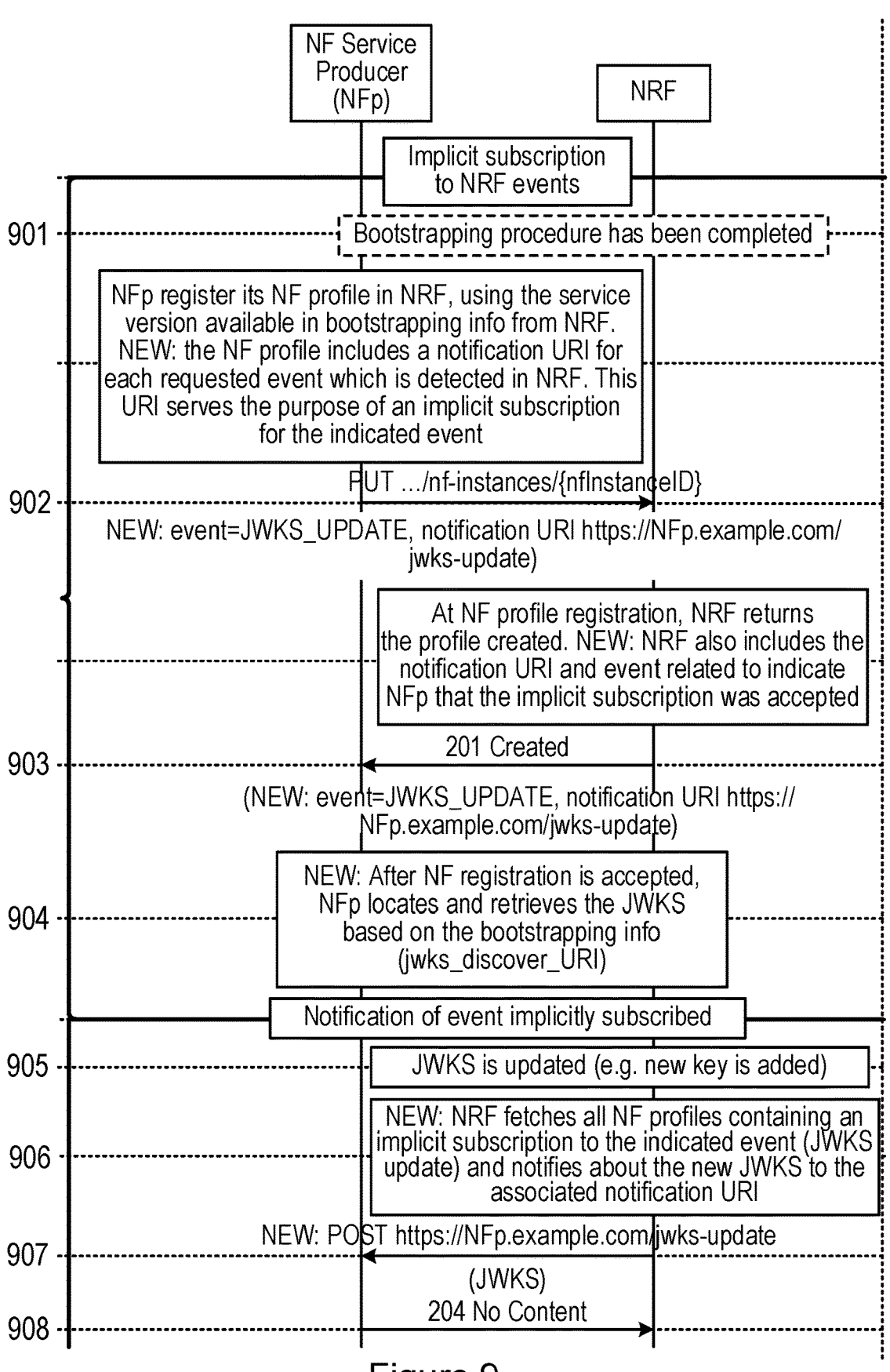
FIG. 9 is a signaling diagram illustrating an example implementation of FIGS. 7 and 8.

For the tracking area information (TAI) update, NF service producers are contacted based on the TAI registered in the NRF by the NF service producer. If the operator, via manual intervention, changes a common configuration in NRF which affects several NF service consumers profile, the NFs are informed about the change. This is an alternative to changing the TAI info in each and every NF service consumer so that they all update the profile in NRF. The main difference is that in the embodiments described herein, the manual changes are done only in NRF; and then via this new mechanism, all NF service producers are notified about the change (the event TAI INFO UPDATE) so they update locally their profiles. In the second case, the manual intervention to change the TAI info may need to be performed in all NF service consumers, and they need to register/update the information in NRF FIG. 9 is a signaling diagram illustrating an example implementation of FIGS. 7 and 8. In FIG. 9 the event comprises an update to a key set (e.g. JWKS) for use in verifying an access token received from an NF service consumer.

In step 901, the NF service producer completes the bootstrapping procedure with the NRF.

In step 902, the NF service producer transmits a registration request to the NRF to register an NF profile of the NF service producer at the NRF, wherein the NF profile comprises a second URI associated with an event. In this example the second URI is the notification URI https://NFp.example.com/jwks-update. In this example, the event is an update to the JWKS (JWKS_UPDATE).

In step 903 the NRF confirms that the NF profile has been created. In some examples, the NRF returns the NF profile created. In this example the NRF profile includes the second URI associated with the event, indicating that the request for subscription to notifications of the event has been accepted. By indicating that the request to subscription to notifications of updates to the key set has been accepted, the NF service producer is aware that it will receive the updated key set when changed and hence there is no need to refresh the key set (e.g. periodically) since the key set locally stored in the NF service producer will be updated by notifications from the NRF when required.

In step 904, after the NF profile is registered, the NF service producer locates and retrieves the key set based on the first URI (as described with reference to FIGS. 4 to 6).

In step 905, the key set (e.g. the JWKS) is updated. For example, a new key may be added to the key set. In some examples, one or more keys are revoked or modified (i.e. the same key identifier is used for another key).

In step 906, the NRF fetches all NF profiles containing an implicit subscription to the event of an update to the key set. It will be appreciated that in some examples more than one NF service producer may have subscribed to receive notifications of the same event.

In step 907, the NRF transmits a notification of the updated key set to the second URI indicated in the NF profile. The notification may comprise an indication of the updates to the key set or the whole key set so that the NF service producers can overwrite the complete key set stored locally. For example, the notification may comprise a new key added to the key set. It will be appreciated that the NRF may notify any NF service producer that subscribed to notifications of updates to the key set. In particular, the NRF may transmit notifications to URIs in the NF profiles of those NF service producers associated with the event of an update to the key set.

In order to improve performance, the NRF may only transmit an indication of the changes made to the key set instead of sending the complete key set. For revoked or modified keys, the NRF may indicate at time at which access tokens signed with the corresponding private key cannot be validated anymore.

In step 908, The NF service producer updates locally the key set. the NF service producer may also acknowledge receipt of the notification of step 907.

Figure 10:
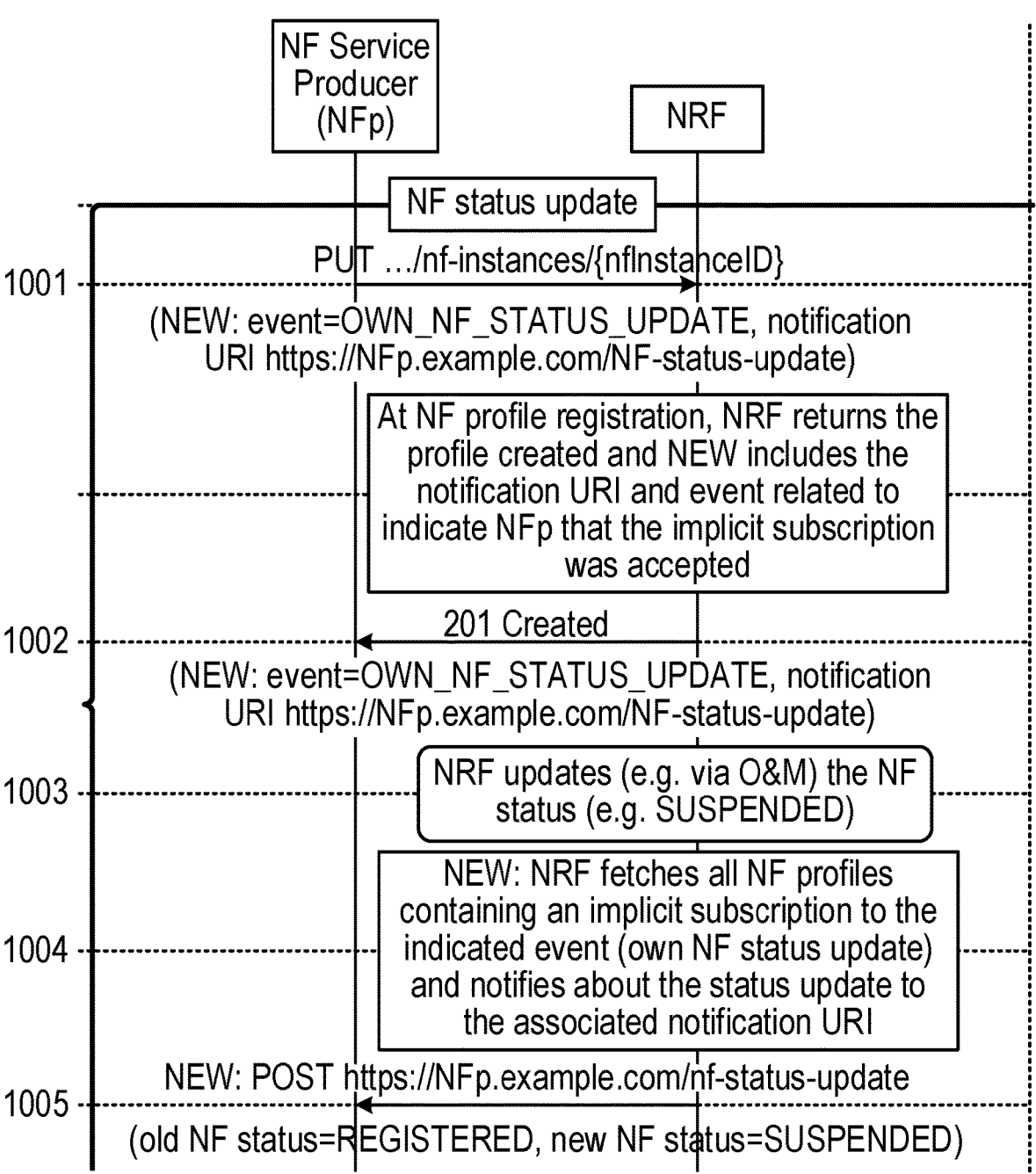
FIG. 10 is a signalling diagram illustrating an example implementation of the methods of FIGS. 7 and 8, In this example, the event comprises a NF status update.

FIG. 10 is a signalling diagram illustrating an example implementation of the methods of FIGS. 7 and 8, In this example, the event comprises a NF status update.

In step 1001, the transmits a registration request to the NRF to register an NF profile of the NF service producer at the NRF, wherein the NF profile comprises a second URI associated with an event. In this example the second URI is the notification URI "https://nfp.example.com/NF-status-update". In this example, the event is an update to the NF status (OWN_NF_STATUS_UPDATE).

In step 1002, the NRF confirms that the NF profile has been created. In some examples, the NRF returns the NF profile created. In this example the NRF profile includes the second URI associated with the event, indicating that the request for subscription to notifications of the event has been accepted.

In step 1003 The NF status of the NF service producer is updated in the NRF (e.g. via Operations and Management (O&M) by the operator). In this example the NF status has been changed to suspended.

In step 1004, the NRF transmits a notification of the updated NF status (e.g. SUSPENDED) to the second URI indicated in the NF profile.

It will be appreciated that responsive to an event occurring, the NRF may therefore determine if the NF profile affected contains an implicit subscription to the event, and if so, the NRF will notify the NF service producer associated with the NF profile by means of the second URI indicated in the NF profile.

Figure 11:
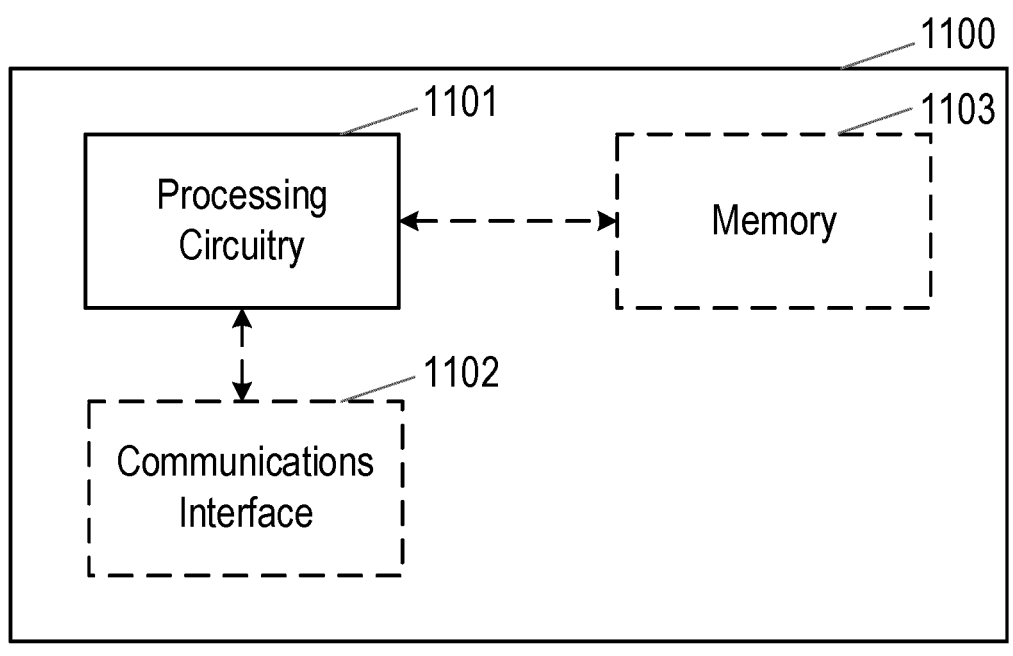
FIG. 11 illustrates a network repository function (NRF) comprising processing circuitry (or logic)

FIG. 11 illustrates a network repository function (NRF) 1100 comprising processing circuitry (or logic) 1101. The processing circuitry 1101 controls the operation of the NRF 1100 and can implement the method described herein in relation to an NRF 1100. The processing circuitry 1101 can comprise one or more processors, processing units, multi-core processors or modules that are configured or programmed to control the NRF 1100 in the manner described herein. In particular implementations, the processing circuitry 1101 can comprise a plurality of software and/or hardware modules that are each configured to perform, or are for performing, individual or multiple steps of the method described herein in relation to the NRF 1100.

Briefly, the processing circuitry 1101 of the NRF 1100 is configured to: receive a request from the NF service producer to provide an indication of services provided by the NRF; and responsive to the request, transmit a first uniform resource identifier, URI, where the key set can be retrieved, as part of an indication of an authorization service.

In some embodiments, the NRF 1100 may optionally comprise a communications interface 1102. The communications interface 1102 of the NRF 1100 can be for use in communicating with other nodes, such as other virtual nodes. For example, the communications interface 1102 of the NRF 1100 can be configured to transmit to and/or receive from other nodes requests, resources, information, data, signals, or similar. The processing circuitry 1101 of NRF 1100 may be configured to control the communications interface 1102 of the NRF 1100 to transmit to and/or receive from other nodes requests, resources, information, data, signals, or similar.

Optionally, the NRF 1100 may comprise a memory 1103. In some embodiments, the memory 1103 of the NRF 1100 can be configured to store program code that can be executed by the processing circuitry 1101 of the NRF 1100 to perform the method described herein in relation to the NRF 1100. Alternatively or in addition, the memory 1103 of the NRF 1100, can be configured to store any requests, resources, information, data, signals, or similar that are described herein. The processing circuitry 1101 of the NRF 1100 may be configured to control the memory 1103 of the NRF 1100 to store any requests, resources, information, data, signals, or similar that are described herein.

Figure 12:
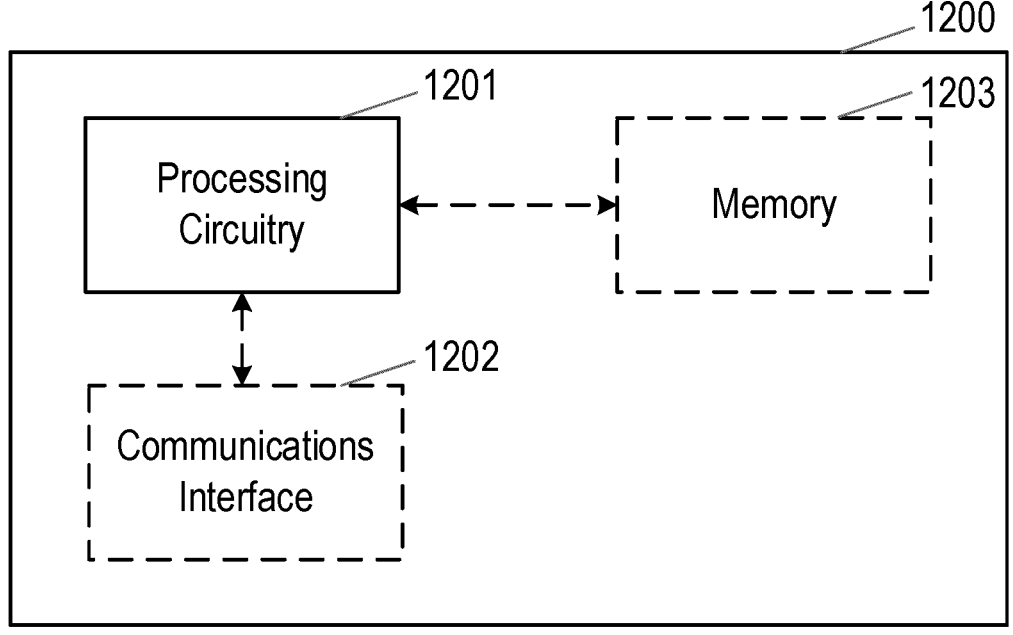
FIG. 12 illustrates an NF service producer comprising processing circuitry (or logic)

FIG. 12 illustrates an NF service producer 1200 comprising processing circuitry (or logic) 1201. The processing circuitry 1201 controls the operation of the NF service producer 1200 and can implement the method described herein in relation to an NF service producer 1200. The processing circuitry 1201 can comprise one or more processors, processing units, multi-core processors or modules that are configured or programmed to control the NF service producer 1200 in the manner described herein. In particular implementations, the processing circuitry 1201 can comprise a plurality of software and/or hardware modules that are each configured to perform, or are for performing, individual or multiple steps of the method described herein in relation to the NF service producer 1200.

Briefly, the processing circuitry 1201 of the NF service producer 1200 is configured to: transmit a request to a network repository function, NRF, requesting an indication of services provided by the NRF; and responsive to transmitting the request, receive a uniform resource identifier (URI), where the key set can be retrieved, as part of an indication of an authorization service.

In some embodiments, the NF service producer 1200 may optionally comprise a communications interface 1202. The communications interface 1202 of the NF service producer 1200 can be for use in communicating with other nodes, such as other virtual nodes. For example, the communications interface 1202 of the NF service producer 1200 can be configured to transmit to and/or receive from other nodes requests, resources, information, data, signals, or similar. The processing circuitry 1201 of NF service producer 1200 may be configured to control the communications interface 1202 of the NF service producer 1200 to transmit to and/or receive from other nodes requests, resources, information, data, signals, or similar.

Optionally, the NF service producer 1200 may comprise a memory 1203. In some embodiments, the memory 1203 of the NF service producer 1200 can be configured to store program code that can be executed by the processing circuitry 1201 of the NF service producer 1200 to perform the method described herein in relation to the NF service producer 1200. Alternatively or in addition, the memory 1203 of the NF service producer 1200, can be configured to store any requests, resources, information, data, signals, or similar that are described herein. The processing circuitry 1201 of the NF service producer 1200 may be configured to control the memory 1203 of the NF service producer 1200 to store any requests, resources, information, data, signals, or similar that are described herein.

Figure 13:
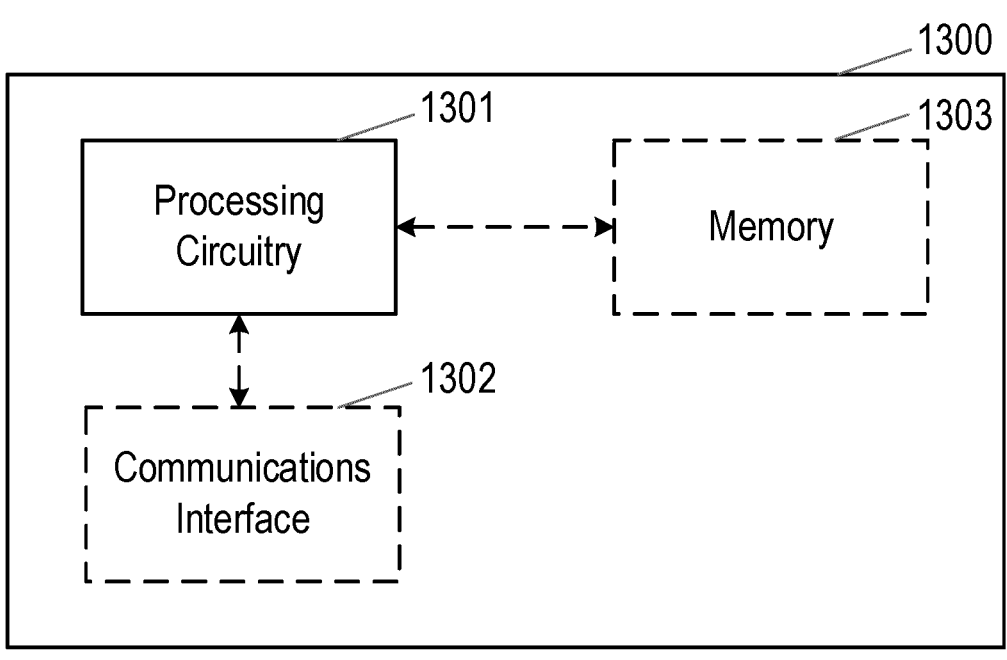
FIG. 13 illustrates a network repository function (NRF) comprising processing circuitry (or logic)

FIG. 13 illustrates a network repository function (NRF) 1300 comprising processing circuitry (or logic) 1301. The processing circuitry 1301 controls the operation of the NRF 1300 and can implement the method described herein in relation to an NRF 1300. The processing circuitry 1301 can comprise one or more processors, processing units, multi-core processors or modules that are configured or programmed to control the NRF 1300 in the manner described herein. In particular implementations, the processing circuitry 1301 can comprise a plurality of software and/or hardware modules that are each configured to perform, or are for performing, individual or multiple steps of the method described herein in relation to the NRF 1300.

Briefly, the processing circuitry 1301 of the NRF 1300 is configured to: receive a registration request from the NF service producer to register an NF profile of the NF service producer at the NRF, wherein the NF profile comprises a URI associated with an event; and responsive to occurrence of the event, transmit an indication of the event to the URI.

In some embodiments, the NRF 1300 may optionally comprise a communications interface 1302. The communications interface 1302 of the NRF 1300 can be for use in communicating with other nodes, such as other virtual nodes. For example, the communications interface 1302 of the NRF 1300 can be configured to transmit to and/or receive from other nodes requests, resources, information, data, signals, or similar. The processing circuitry 1301 of NRF 1300 may be configured to control the communications interface 1302 of the NRF 1300 to transmit to and/or receive from other nodes requests, resources, information, data, signals, or similar.

Optionally, the NRF 1300 may comprise a memory 1303. In some embodiments, the memory 1303 of the NRF 1300 can be configured to store program code that can be executed by the processing circuitry 1301 of the NRF 1300 to perform the method described herein in relation to the NRF 1300. Alternatively or in addition, the memory 1303 of the NRF 1300, can be configured to store any requests, resources, information, data, signals, or similar that are described herein. The processing circuitry 1301 of the NRF 1300 may be configured to control the memory 1303 of the NRF 1300 to store any requests, resources, information, data, signals, or similar that are described herein.

Figure 14:
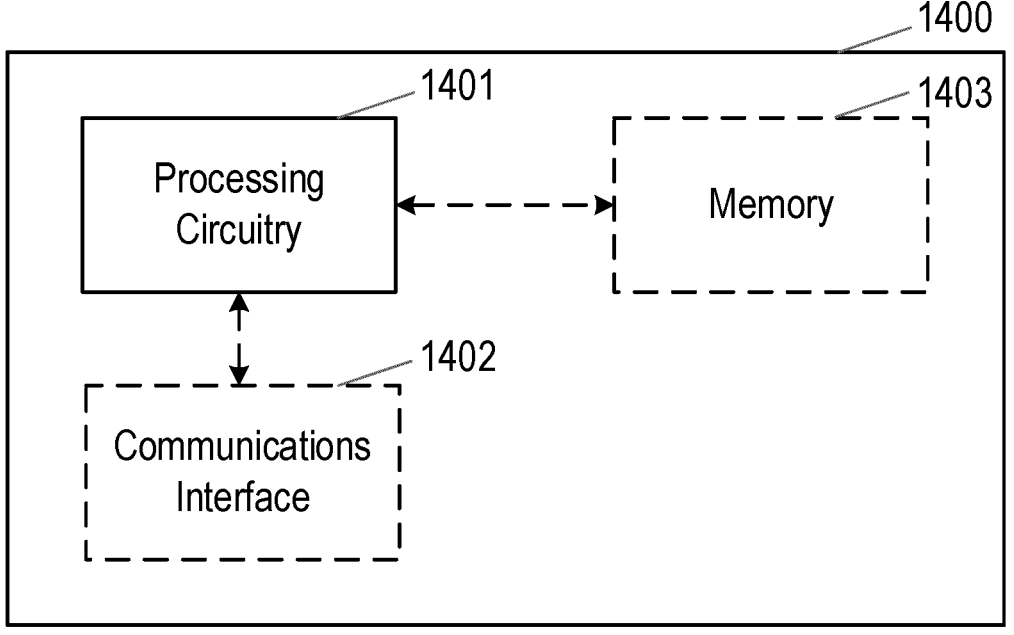
FIG. 14 illustrates an NF service producer comprising processing circuitry (or logic).

FIG. 14 illustrates an NF service producer 1400 comprising processing circuitry (or logic) 1401. The processing circuitry 1401 controls the operation of the NF service producer 1400 and can implement the method described herein in relation to an NF service producer 1400. The processing circuitry 1401 can comprise one or more processors, processing units, multi-core processors or modules that are configured or programmed to control the NF service producer 1400 in the manner described herein. In particular implementations, the processing circuitry 1401 can comprise a plurality of software and/or hardware modules that are each configured to perform, or are for performing, individual or multiple steps of the method described herein in relation to the NF service producer 1400.

Briefly, the processing circuitry 1401 of the NF service producer 1400 is configured to: transmit a registration request to the NRF to register an NF profile of the NF service producer at the NRF, wherein the NF profile comprises a URI associated with an event; and responsive to occurrence of the event, receive, from the NRF, an indication of the event at the URI.

In some embodiments, the NF service producer 1400 may optionally comprise a communications interface 1402. The communications interface 1402 of the NF service producer 1400 can be for use in communicating with other nodes, such as other virtual nodes. For example, the communications interface 1402 of the NF service producer 1400 can be configured to transmit to and/or receive from other nodes requests, resources, information, data, signals, or similar. The processing circuitry 1401 of NF service producer 1400 may be configured to control the communications interface 1402 of the NF service producer 1400 to transmit to and/or receive from other nodes requests, resources, information, data, signals, or similar.

Optionally, the NF service producer 1400 may comprise a memory 1403. In some embodiments, the memory 1403 of the NF service producer 1400 can be configured to store program code that can be executed by the processing circuitry 1401 of the NF service producer 1400 to perform the method described herein in relation to the NF service producer 1400. Alternatively or in addition, the memory 1403 of the NF service producer 1400, can be configured to store any requests, resources, information, data, signals, or similar that are described herein. The processing circuitry 1401 of the NF service producer 1400 may be configured to control the memory 1403 of the NF service producer 1400 to store any requests, resources, information, data, signals, or similar that are described herein.

Embodiments described herein provide a standard mechanism for all NF service producers in 5GC to locate/discover the key set (e.g. JWKS) used by the NRF to digitally sign the access tokens. This allows a single point of configuration for the public keys, instead of configuring each and every NF service producer in the 5GC network with the key set.

In other words, the embodiments described herein provide a new 5GC automation sort of "plug and play" which also removes the potential inconsistencies of manual configuration and maintenance across different NF service producers for the same key set.

There is also provided a generic mechanism to implicitly (and dynamically) subscribe to certain events detected at NRF, for example updates to the key set.

By being able to subscribe to the updates to the key set embodiments described herein allow for an efficient method to deploy any change in the key set for verification of authorization tokens in the Oauth authorization framework, according to 3GPP TS 33.501. This method is not prone to errors and much more efficient when compared to manual re-configuration of the key set in all the NF service producers, since the changes in the key set are immediately and automatically notified to all the NF service producers. Furthermore, the embodiments described herein are much more efficient when compared to the jku indication in the service request (as described in the background section), since there is no need to access an URI to retrieve the a key for each token to verify. The key set is stored locally in each NF service producer and there is a call to the notification URI only when there is a change in the key set.

In some embodiments the method may be even more efficient when notification is limited to the changes (keys that have been removed/added/modified) and not to the whole key set.

Embodiments in which the event comprises an NF Status Update, allow any NF service producer to be informed about any NF status change in NRF not initiated by NF, e.g. to suspend any given NF service producers or set of NF service producers (e.g. in the same locality/data center) from managing traffic via O&M in a centralized manner in NRF, without the need to access each and every affected NF to set the suspended status.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a network repository function, NRF, for providing a network function, NF, service producer access to a key set, wherein the key set is for use in verifying an access token received from an NF service consumer, the method comprising:

receiving a request from the NF service producer to provide an indication of a plurality of services provided by the NRF; and responsive to the request, transmitting a first address where a key set for the plurality of services can be retrieved, as part of an indication of an authorization service.

2. The method as claimed in claim 1 wherein the first address comprises a first uniform resource identifier, URI.

3. The method as in claim 1 further comprising: receiving a registration request from the NF service producer to register an NF profile of the NF service producer at the NRF.

4. The method as in claim 3 further comprising, after receiving the registration request, receiving from the NF service producer a request for the key set, wherein the request for the key set is sent to the first address.

5. The method as in claim 4 further comprising responsive to the request for the key set, transmitting the key set to the NF service producer.

6. The method as claim 3 wherein the NF profile comprises a second address associated with an event.

7. The method as in claim 6 further comprising: responsive to occurrence of the event transmitting a notification of the event to the second address.

8. The method as in claim 6 wherein the event comprises an update to the key set.

9. The method as in claim 6 wherein the event comprises an own NF status update.

10. A method in a network function, NF, service producer for obtaining access to a key set, wherein the key set is for use in verifying an access token received from an NF service consumer, the method comprising:

transmitting a request to a network repository function, NRF, requesting an indication of a plurality of services provided by the NRF; and responsive to transmitting the request, receiving a first address, where a key set for the plurality of services can be retrieved, as part of an indication of an authorization service.

11. The method as claimed in claim 10 wherein the first address comprises a first uniform resource identifier, URI.

12. The method as in claim 10 further comprising: transmitting a registration request to the NRF to register an NF profile of the NF service producer at the NRF.

13. The method as in claim 12 further comprising, after transmitting the registration request, transmitting a request for the key set to the first address.

14. The method as in claim 13 further comprising responsive to the transmitting request for the key set, receiving the key set from the NRF.

15. The method as in claim 12 wherein the NF profile comprises a second address associated with a requested notification of an event.

16. The method as in claim 15 further comprising receiving a notification of the event responsive to occurrence of the event.

17. The method as in claim 15 wherein the event comprises an update to the key set.

18. The method as in claim 15 wherein the event comprises an NF status update.

19. A network repository function, NRF, for providing a network function, NF, service producer access to a key set, wherein the key set is for use in verifying an access token received from an NF service consumer, wherein the NRF comprises processing circuitry configured to cause the NRF to:

receive a request from the NF service producer to provide an indication of a plurality of services provided by the NRF; and responsive to the request, transmit a first address, where a key set for the plurality of services can be retrieved, as part of an indication of an authorization service.

20. A network function, NF, service producer for obtaining access to a key set, wherein the key set is for use in verifying an access token received from an NF service consumer, the NF service producer comprising processing circuitry configured to cause the NF service producer to:

transmit a request to a network repository function, NRF, requesting an indication of a plurality of services provided by the NRF; and responsive to transmitting the request, receive a first address, where a key set for the plurality of services can be retrieved, as part of an indication of an authorization service.

\* \* \* \* \*